(12) United States Patent
Guo

(10) Patent No.: US 12,425,946 B2
(45) Date of Patent: Sep. 23, 2025

(54) TERMINAL DEVICE AND NETWORK DEVICE

(71) Applicant: GUANGDONG OPPO MOBILE TELECOMMUNICATIONS CORP., LTD., Guangdong (CN)

(72) Inventor: Yali Guo, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 18/340,700

(22) Filed: Jun. 23, 2023

(65) Prior Publication Data
US 2023/0337111 A1    Oct. 19, 2023

Related U.S. Application Data

(63) Continuation of application No. PCT/CN2021/074230, filed on Jan. 28, 2021.

(51) Int. Cl.
| H04W 40/22 | (2009.01) |
| H04W 76/14 | (2018.01) |
| H04W 88/04 | (2009.01) |

(52) U.S. Cl.
CPC ........... *H04W 40/22* (2013.01); *H04W 76/14* (2018.02); *H04W 88/04* (2013.01)

(58) Field of Classification Search
None
See application file for complete search history.

(56) References Cited

U.S. PATENT DOCUMENTS

| 10,805,858 | B2 | 10/2020 | Loehr et al. | |
| 2008/0212495 | A1* | 9/2008 | Stirbu | H04L 61/5014 370/254 |
| 2015/0372897 | A1* | 12/2015 | Han | H04L 47/00 370/254 |
| 2016/0381720 | A1* | 12/2016 | Baek | H04W 8/14 370/329 |
| 2020/0214054 | A1* | 7/2020 | Qiao | H04L 47/781 |
| 2021/0250749 | A1* | 8/2021 | Cheng | H04W 8/005 |
| 2021/0289392 | A1* | 9/2021 | Paladugu | H04W 76/14 |

(Continued)

FOREIGN PATENT DOCUMENTS

| CN | 108632308 A | 10/2018 |
| CN | 109076632 A | 12/2018 |

(Continued)

OTHER PUBLICATIONS

3GPP TS 23.303 V16.0.0 (Jul. 2020) (Year: 2020).*

(Continued)

*Primary Examiner* — Andre Tacdiran
(74) *Attorney, Agent, or Firm* — PERKINS COIE LLP

(57) ABSTRACT

Terminal devices and a network device are provided. A first terminal device includes a transceiver, a processor, and a memory storing computer programs. The computer programs, when executed by the processor, are operable with the processor to: cause the transceiver to receive first information and relay-data type information corresponding to the first information from a network device, where the relay-data type information is indicative a type of relay data, and cause the transceiver to send relay data of the type to a second terminal device.

15 Claims, 6 Drawing Sheets

(56) References Cited

U.S. PATENT DOCUMENTS

| | | | | |
|---|---|---|---|---|
| 2022/0095398 | A1* | 3/2022 | Pan | H04W 76/14 |
| 2022/0303749 | A1* | 9/2022 | Wu | H04W 24/08 |
| 2022/0322202 | A1* | 10/2022 | Li | H04M 15/93 |
| 2023/0035694 | A1* | 2/2023 | Ding | H04L 12/1407 |
| 2023/0047009 | A1* | 2/2023 | Kim | H04W 8/005 |
| 2023/0078317 | A1* | 3/2023 | Xing | H04B 7/15 |
| | | | | 370/315 |
| 2023/0354085 | A1* | 11/2023 | Deng | H04W 40/22 |
| 2023/0370902 | A1* | 11/2023 | Wang | H04W 28/0268 |
| 2023/0397000 | A1* | 12/2023 | Wifvesson | H04W 12/043 |
| 2024/0305980 | A1* | 9/2024 | Ferdi | H04W 76/14 |

FOREIGN PATENT DOCUMENTS

| | | | |
|---|---|---|---|
| CN | 202010350672.0 | * | 4/2020 |
| CN | 111278031 A | | 6/2020 |

OTHER PUBLICATIONS

3GPP TS 33.303 V16.0.0 (Jul. 2020) (Year: 2020).*
3GPP TS 23.303 V16.0.0 (Jul. 2020). Technical Specification Group Services and System Aspects; Proximity-based services (ProSe); Stage 2 (Release 16) (Year: 2020).*
3GPP TS 23.501 V16.7.0 (Dec. 2020) (Year: 2020).*
3GPP TR 23.752 V1.0.0 (Nov. 2020); 3rd Generation Partnership Project; Technical Specification Group Services and System Aspects; Study on system enhancement for Proximity based Services (ProSe) in the 5G System (5GS) (Release 17). (177 pages).
SA WG2 Meeting #139e; Elbonia, Jun. 1-12, 2020; S2-2004202; Philips International B.V.; "UE-to-Network Relay discovery and handling of PDU session parameters with Remote UE based relay selection". (7 pages).
SA WG2 Meeting #140e; Aug. 19-Sep. 1, 2020, Electronic, Elbonia; S2-2005756; Philips International B.V.; "KI#3, New Solution: Network assisted relay selection". (4 pages).
WIPO, International Search Report and Written Opinion for International Application No. PCT/CN2021/074230, Oct. 18, 2021. (16 pages with English translation).
Examination Report issued in corresponding EP application No. 21921815.3 dated Aug. 13, 2024. 8 pages.
Notice of Reasons for Refusal issued in corresponding JP application No. 2023-540975 dated Oct. 25, 2024. 8 pages with English translation.
3GPP Draft; SP-200962.ZIP 23752-100; 3GPP TR 23.752 V1.0.0 (Nov. 2020), 3rd Generation Partnership Project; Technical Specification Group Services and System Aspects; Study on system enhancement for Proximity based Services, (ProSe) in the 5G System (5GS), (Release 17); Retrieved from the Internet; URL: https://ftp.3gpp.org/tsg_sa/TSG_SA/TSGs_90E_Electronic/Docs/, SP-200962.zip 23752-100.zip 23752-100.docx. (181 pages).
Vivo, KI#3, Sol#35: Updates with EN resolving, SA WG2 Meeting #142E S2-2008591, Nov. 16-20, 2020, Electronic. (5 pages).
Intel, KI#8, Solution #35 Clarification, 3GPP TSG-SA/WG2 Meeting #142e S2-2009460, Elbonia, Nov. 16-20, 2020 (revision of S2-2008374r04). (5 pages).
Fraunhofer HHI, KI#3, #8, Resolve EN in Sol #35: Authorization for 5G ProSe UE-to-Network Relay Service, 3GPP TSG-WG SA2 Meeting #141E e-meeting S2-2006929 Elbonia, Oct. 12-23, 2020. (6 pages).
Extended European search report issued in corresponding European application No. 21921815.3 dated Nov. 22, 2023. (15 pages).
Examination Report issued in corresponding EP application No. 21921815.3 dated Mar. 4, 2025. 9 pages.

* cited by examiner

700

NETWORK DEVICE SENDS FIRST INFORMATION AND RELAY-DATA TYPE INFORMATION CORRESPONDING TO FIRST INFORMATION TO FIRST TERMINAL DEVICE, AND SEND FIRST INFORMATION AND FIRST-SESSION TYPE INFORMATION CORRESPONDING TO FIRST INFORMATION TO SECOND TERMINAL DEVICE, WHERE RELAY-DATA TYPE INFORMATION IS INDICATIVE OF FIRST TYPE OF RELAY DATA, FIRST-SESSION TYPE INFORMATION IS INDICATIVE OF SECOND TYPE OF FIRST SESSION, AND RELAY DATA OF FIRST TYPE CAN BE TRANSMITTED OVER FIRST SESSION OF SECOND TYPE — S710

FIG. 7

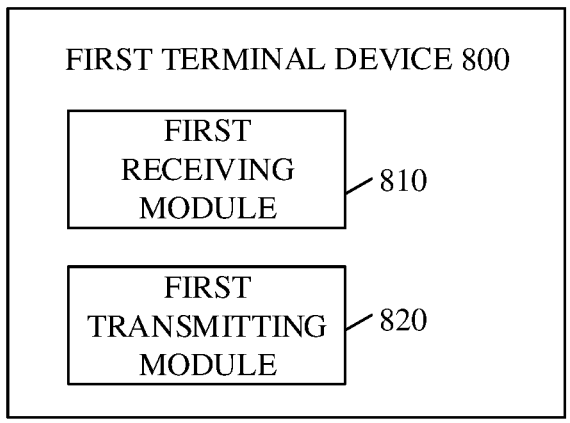

FIG. 8

TERMINAL DEVICE AND NETWORK DEVICE

CROSS-REFERENCE TO RELATED APPLICATION(S)

This application is a continuation of PCT Application No. PCT/CN2021/074230, filed Jan. 28, 2021, the entire disclosure of which is hereby incorporated by reference.

TECHNICAL FIELD

This disclosure relates to the field of communication, and more particularly to a method for data transmission, a terminal device, and a network device.

BACKGROUND

A user equipment (UE) having proximity-based service (ProSe) capability can communicate directly with another UE having ProSe capability over a short-range communication connection interface. If a UE can be connected to an external data network over a communication network and also has ProSe capability, the UE can act as a relay UE, and another remote UE having ProSe capability can establish a direct connection with the relay UE over a short-range communication interface and communicate with an external network over a session established between the relay UE and the communication network.

In the related art, a session established between the relay UE and the core network has various types, where different types of sessions can be used for transmitting data of corresponding types, and relay data transmitted between the remote UE and the relay UE may also have various types, and as a result, the type of the session between the relay UE and the core network may be incompatible with the type of relay data sent by the remote UE. For example, if the relay data transmitted between the remote UE and the relay UE cannot be transmitted over the type of the session established between the relay UE and the core network, the relay UE will be unable to transfer correctly data received from the remote UE, thus resulting in failure in data transmission.

SUMMARY

Implementations of the disclosure further provide a first terminal device. The first terminal device includes a transceiver; a processor; and a memory storing computer programs which, when executed by the processor, are operable with the processor to: cause the transceiver to receive first information and relay-data type information corresponding to the first information from a network device, where the relay-data type information indicates a type of relay data, and cause the transceiver to send relay data of the type to a second terminal device.

Implementations of the disclosure also provide a second terminal device. The second terminal device includes a transceiver; a processor; and a memory storing computer programs which, when executed by the processor, are operable with the processor to: cause the transceiver to receive first information and first-session type information corresponding to the first information from a network device, where the first-session type information is indicative of a type of a first session, and establish the first session of the type.

Implementations of the disclosure further provide a network device. The network device includes a transceiver; a processor; and a memory storing computer programs which, when executed by the processor, are operable with the processor to: cause the transceiver to send first information and relay-data type information corresponding to the first information to a first terminal device, and send the first information and first-session type information corresponding to the first information to a second terminal device, where the relay-data type information is indicative of a first type of relay data, and the first-session type information is indicative of a second type of a first session. Relay data of the first type can be transmitted over the first session of the second type.

BRIEF DESCRIPTION OF THE DRAWINGS

FIG. 7 is a schematic flowchart of a method 700 for transmission type configuration according to implementations of the disclosure.

FIG. 8 is a schematic structural diagram of a first terminal device 800 according to implementations of the disclosure.

DETAILED DESCRIPTION

Figure 1:
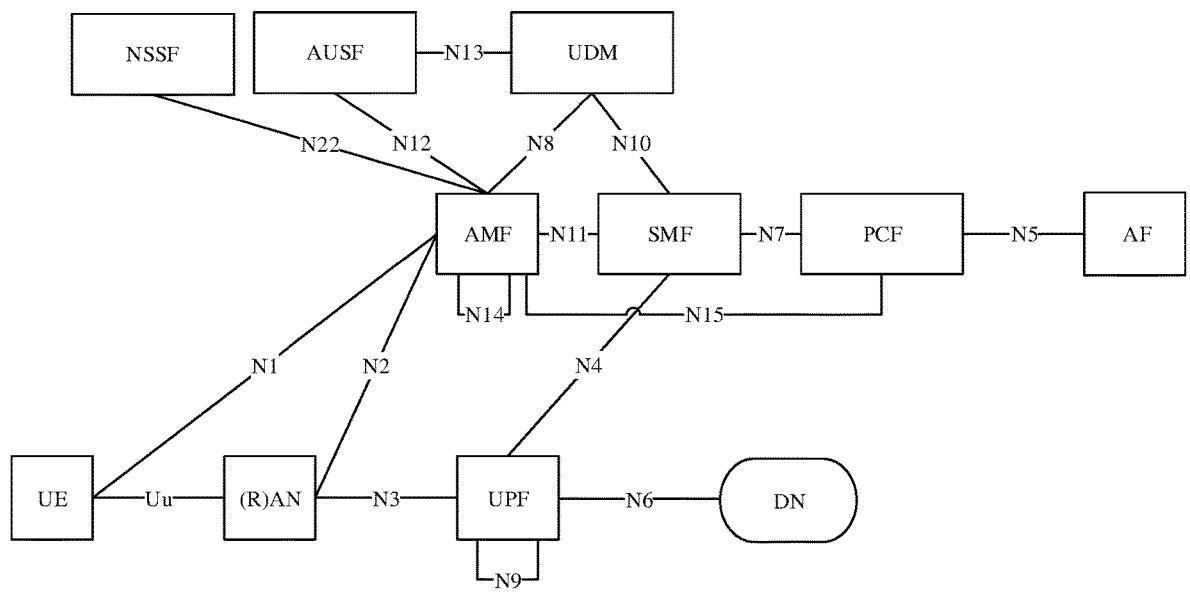
FIG. 1 is a schematic diagram of an application scenario according to implementations of the disclosure.

The following will describe technical solutions of implementations of the disclosure with reference to the accompanying drawings in the implementations of the disclosure.

It should be noted that, the terms "first", "second", and the like used in the specification of implementations and claims of the disclosure and the above accompanying drawings are used to distinguish similar objects, and are not necessarily used to describe a particular sequence or order. The objects described by "first" and "second" may be the same or different.

The technical solutions of the implementations of the disclosure are applicable to various communication systems, for example, a global system of mobile communication (GSM), a code division multiple access (CDMA) system, a wideband code division multiple access (WCDMA) system, a general packet radio service (GPRS), a long term evolution (LTE) system, an advanced LTE (LTE-A) system, a new radio (NR) system, an evolved system of an NR system, an LTE-based access to unlicensed spectrum (LTE-U) system, an NR-based access to unlicensed spectrum (NR-U) system, a universal mobile telecommunication system (UMTS), a wireless local area network (WLAN), a wireless fidelity (WiFi), a 5th generation (5G) system, or other communication systems, etc.

Generally speaking, a conventional communication system generally supports a limited quantity of connections and therefore is easy to implement. However, with development of communication technology, a mobile communication system will not only support conventional communication but also support, for example, device to device (D2D) communication, machine to machine (M2M) communication, machine type communication (MTC), and vehicle to vehicle (V2V) communication, etc. Implementations of the disclosure can also be applied to these communication systems.

Optionally, the communication system in implementations of the disclosure may be applied to a carrier aggregation (CA) scenario, a dual connectivity (DC) scenario, or a standalone (SA) network deployment scenario.

There is no limitation on the spectrum adopted in implementations of the disclosure. For example, the communication system in implementations of the disclosure is applicable to a licensed spectrum, or is applicable to an unlicensed spectrum.

Various implementations of the disclosure are described in connection with a network device and a terminal device. The terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device, etc. The terminal device may be a station (ST) in a WLAN, a cellular radio telephone, a cordless telephone, a session initiation protocol (SIP) telephone, a wireless local loop (WLL) station, a personal digital assistant (PDA), a handheld device or a computing device with wireless communication functions, other processing devices coupled with a wireless modem, an in-vehicle device, a wearable device, and a terminal device in a next-generation communication system, for example, a terminal device in an NR network, or a terminal device in a future evolved public land mobile network (PLMN), etc.

By way of explanation rather than limitation, in implementations of the disclosure, the terminal device may also be a wearable device. The wearable device may also be called a wearable smart device, which is a generic term of wearable devices obtained through intelligentization design and development on daily wearing products with wearable technology, for example, glasses, gloves, watches, clothes, accessories, and shoes. The wearable device is a portable device that can be directly worn or integrated into clothes or accessories of a user. In addition to being a hardware device, the wearable device can also realize various functions through software support, data interaction, and cloud interaction. A wearable smart device in a broad sense includes, for example, a smart watch or smart glasses with complete functions and large sizes and capable of realizing independently all or part of functions of a smart phone, and for example, various types of smart bands and smart jewelries for physical monitoring, of which each is dedicated to application functions of a certain type and required to be used together with other devices such as a smart phone.

The network device may be a device for communicating with a mobile device, and the network device may be an access point (AP) in a WLAN, a base transceiver station (BTS) in GSM or CDMA, may also be a Node B (NB) in WCDMA, and may also be an evolutional Node B (eNB or eNodeB) in LTE, or a relay station or an AP, or an in-vehicle device, a wearable device, a gNB in an NR network, or network device in a future evolved PLMN, etc.

In implementations of the disclosure, the network device provides services for a cell, and the terminal device communicates with the network device on a transmission resource (for example, a frequency-domain resource or a spectrum resource) for the cell. The cell may be a cell corresponding to the network device (for example, a base station). The cell may belong to a macro base station, or may belong to a base station corresponding to a small cell. The small cell may include: a metro cell, a micro cell, a pico cell, a femto cell, and the like. These small cells are characterized by small coverage and low transmission power and are adapted to provide data transmission service with high-rate.

FIG. 1 exemplarily illustrates an architectural diagram of a 5th generation (5G) network system 100. As illustrated in FIG. 1, a UE establishes an access stratum (AS) connection with an access network (AN) over a UE-universal mobile telecommunication system (UMTS) terrestrial radio access network (UE-UTRAN, Uu) interface, and communicates an AS message and performs wireless data transmission with the AN. The UE establishes a non-access stratum (NAS) connection with an access and mobility management function (AMF) over an N1 interface and communicates an NAS message with the AMF. In addition to mobility management for the UE, the AMF is also responsible for forwarding a session management-related message between the UE and a session management function (SMF). A policy control function (PCF) is responsible for providing policies related to mobility management, session management, and charging for the UE. A user plane function (UPF) performs data transmission with an external data network (DN) over an N6 interface, and performs data transmission with the AN over an N3 interface. After accessing a 5G network over the Uu interface, the UE establishes a protocol data unit (PDU) session under control of the SMF for data transmission.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein generally indicates that the associated objects are in an "or" relationship.

It should be understood that, "indication" referred to in implementations of the disclosure may be a direct indication, may be an indirect indication, or may mean that there is an association relationship. For example, A indicates B may mean that A directly indicates B, for instance, B can be obtained according to A; may mean that A indirectly indicates B, for instance, A indicates C, and B can be obtained according to C; or may mean that that there is an association relationship between A and B.

In the elaboration of implementations of the disclosure, the term "correspondence" may mean that there is a direct or indirect correspondence between the two, may mean that there is an association between the two, or may mean a relationship of indicating and indicated or configuring and configured, etc.

In order for better understanding of the technical solutions of the implementations of the disclosure, the related art of the implementations of the disclosure will be elaborated below. The related art elaborated below as an optional solution may be arbitrarily combined with the technical solutions of the implementations of the disclosure, which shall all belong to the protection scope of the implementations of the disclosure.

Figure 2:
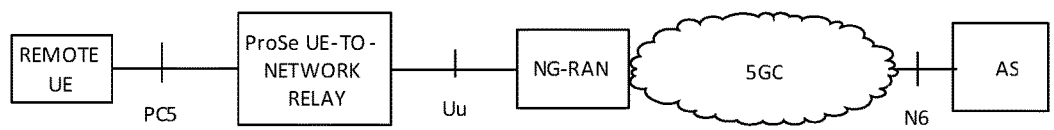
FIG. 2 is a block diagram of a system 200 for relay transmission using a proximity-based service (ProSe) function in a $5^{th}$ generation (5G) network.

FIG. 2 is a block diagram of a system 200 for relay transmission using a proximity-based service (ProSe) function in a 5G network. As illustrated in FIG. 2, a UE having ProSe capability can communicate directly with another UE having ProSe capability over a ProSe communication (interface) 5 (PC5 interface). If a UE can be connected to an external data network over a 5G network and also has ProSe capability, the UE can act as a relay UE, and another remote UE having ProSe capability can establish a direct connection with the relay UE over a PC5 interface and communicate with an external network over a PDU session established between the relay UE and the 5G network.

In the related art, a PDU session established between the relay UE and the core network may be of an internet protocol (IP) type, an Ethernet type, or an unstructured type, which are respectively used for transmitting data with an IP packet header, data with an Ethernet packet header, and data with an unstructured packet header. Data transmitted between the remote UE and the relay UE may also be of an IP type, an Ethernet type, or an unstructured type. If the type of data to-be-relayed (hereinafter, "relay data" for short) sent from the remote UE to the relay UE is inconsistent with the type of the PDU session established between the relay UE and the core network, the relay UE may be unable to transfer correctly data received from the remote UE. For example, the PDU session established between the relay UE and the core network is of the Ethernet type, but relay data received by the relay UE from the remote UE is of the IP type or the unstructured type; or the PDU session established between the relay UE and the core network is of the unstructured type, but the relay data received by the relay UE from the remote UE is of the IP type or the Ethernet type. In the above two cases, the relay UE cannot perform relay transmission of data.

Implementations of the disclosure provide a method for data transmission, a terminal device, and a network device, which can ensure that relay data is correctly transmitted between a relay and a network.

To this end, the disclosure provides a method for data transmission. The method provided in the disclosure can not only be applied to a 5G network but also be applied to other communication networks.

Figure 3:
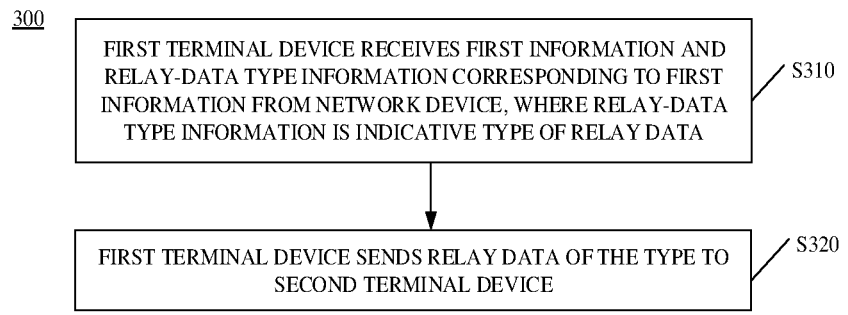
FIG. 3 is a schematic flowchart of a method 300 for data transmission according to implementations of the disclosure.

FIG. 3 is a schematic flowchart of a method 300 for data transmission according to implementations of the disclosure. The method optionally can be applied to the system illustrated in FIG. 1 or FIG. 2, but is not limited thereto. The method includes at least some of the following.

S310, a first terminal device receives first information and relay-data type information corresponding to the first information from a network device, where the relay-data type information is indicative a type of relay data.

S320, the first terminal device sends relay data of the type to a second terminal device.

Optionally, the first terminal device includes a terminal device acting as a remote UE, and the second terminal device includes a terminal device acting as a relay UE.

In some implementations, the type of relay data includes an IP type, an Ethernet type, or an unstructured type.

In some implementations, the first information includes at least one of: a relay service code (RSC), application information, domain name information, or connection capability information requested by an application.

The application information may be an application identity (ID).

The connection capability information requested by an application may be an instant-messaging connection, an Internet connection, or the like.

Optionally, the first terminal device receives the first information and the relay-data type information corresponding to the first information from the network device in step S310 as follows. The first terminal device receives a short-range communication configuration from the network device, where the short-range communication configuration includes the first information and the relay-data type information corresponding to the first information.

In some implementations, before the first terminal device sends the relay data of the type to the second terminal device, the method may further include the following. The first terminal device establishes a short-range communication connection with the second terminal device, where the short-range communication connection corresponds to the first information.

The short-range communication connection may be a PC5 connection.

The first terminal device can send the relay data of the type corresponding to the first information over the short-range communication connection between the first terminal device and the second terminal device corresponding to the first information.

In some implementations, the network device includes a PCF.

Exemplarily, in the following embodiments, the method is applied to a 5G network, the network device is a PCF, the first terminal device is a remote UE, and the second terminal device is a relay UE.

Embodiment I

Figure 4:
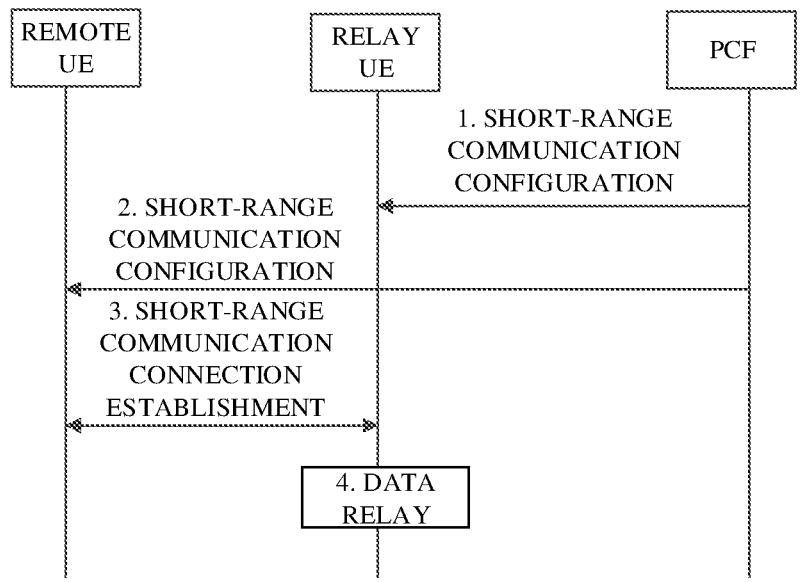
FIG. 4 is a flowchart illustrating implementation of embodiment I of the disclosure.

FIG. 4 is a flowchart illustrating implementation of embodiment I of the disclosure, which includes the following.

A PCF sends a short-range communication configuration to a terminal acting as a relay UE. The short-range communication configuration includes the first information and a PDU session type (hereinafter, "second type" for short) corresponding to the first information. The PDU session type includes an IP type, an Ethernet type, or an unstructured type. The first information includes one or more of: an RSC, application information (e. g. application ID), domain name information, or connection capability information requested by an application (e. g. instant-messaging connection, Internet connection).

In addition, the PCF sends a short-range communication configuration to a terminal acting as a remote UE. The short-range communication configuration includes the first information and a relay-data type (hereinafter, "first type" for short) corresponding to the first information. The relay-data type includes an IP type, an Ethernet type, or an unstructured type. The first information includes one or more of: an RSC, application information (e. g. application ID), domain name information, or connection capability information requested by an application (e. g. instant-messaging connection, Internet connection).

When configuring the relay-data type and the PDU session type, the PCF needs to ensure that relay data of the first type can be transmitted over the PDU session of the second type.

For example, if the PDU session type corresponding to the first information configured for the relay UE by the PCF is the Ethernet type, the relay-data type corresponding to the first information configured for the remote UE is also the Ethernet type.

For another example, if the PDU session type corresponding to the first information configured for the relay UE by the PCF is the unstructured type, the relay-data type corresponding to the first information configured for the remote UE is also the unstructured type.

For another example, if the PDU session type corresponding to the first information configured for the relay UE by the PCF is the IP type, the relay-data type corresponding to the first information configured for the remote UE may be the IP type, the Ethernet type, or the unstructured type.

If the remote UE needs to relay services via the relay UE, a PC5 connection corresponding to the first information is established between the remote UE and the relay UE. Exemplarily, the first information is an RSC, and a procedure for PC5 connection establishment may include the following. The relay UE broadcasts multiple RSCs supported by the relay UE. The remote UE selects one RSC from the multiple RSCs supported by the relay UE, and sends a short-range connection establishment request to the relay UE to request to establish a PC5 connection corresponding to the RSC. The relay UE replies a short-range connection establishment response to the remote UE, and establishes a PC5 connection between the relay UE and the remote UE corresponding to the RSC. The above is only an example of a procedure for PC5 connection establishment. In implementations of the disclosure, a short-range communication connection between the remote UE and the relay UE may also be established in other manners, and the short-range communication connection may be a PC5 connection or other forms of communication connection.

Then, the remote UE determines the relay-data type according to the short-range communication configuration obtained from the PCF, and sends relay data of the type to the relay UE over the PC5 connection between the relay UE and the remote UE. The relay UE determines a PDU session type between the relay UE and a core network corresponding to the first information according to the short-range communication configuration obtained from the PCF, establishes a PDU session of the type, and relays, over the PDU session, data received from the remote UE. Since relay data of the first type can be transmitted over the PDU session of the second type configured by the PCF, the data received from the remote UE by the relay UE can be transmitted correctly.

Embodiment II

Figure 5:
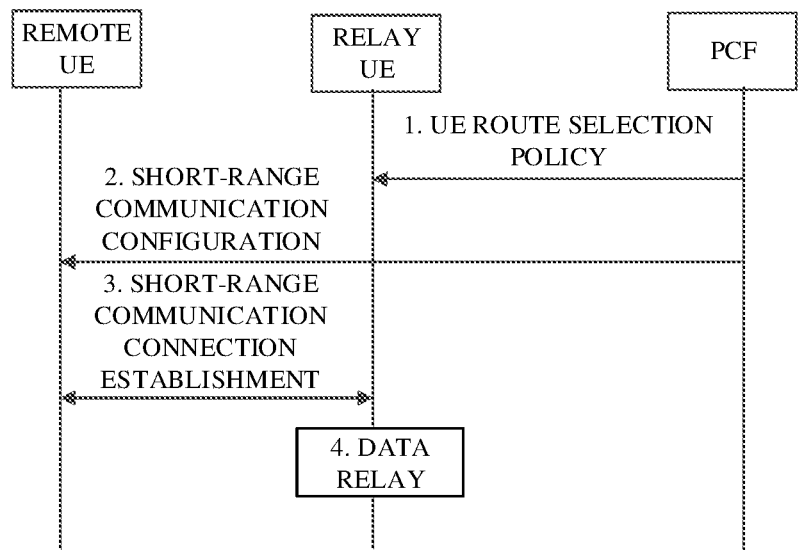
FIG. 5 is a flowchart illustrating implementation of embodiment II of the disclosure.

FIG. 5 is a flowchart illustrating implementation of Embodiment II of the disclosure. As illustrated in FIG. 5, a PCF sends a UE route selection policy to a terminal acting as a relay UE, where the UE route selection policy includes the first information and a PDU session type corresponding to the first information.

Other contents in this embodiment are similar to the corresponding contents in Embodiment I, and thus will not be described in detail again herein.

As can be seen, in the above two embodiments, through configuration for each of the remote UE and the relay UE by the PCF, it is possible to avoid inconsistency between the type of relay data sent from the remote UE to the relay UE and the type of PDU session established between the relay UE and the core network, such that the relay UE can transmit correctly data received from the remote UE.

It should be noted that, the above examples are merely illustrative, and the method provided in the disclosure can be applied not only to a 5G network, and the session established between the relay UE and the core network is not limited to a PDU session.

Figure 6:
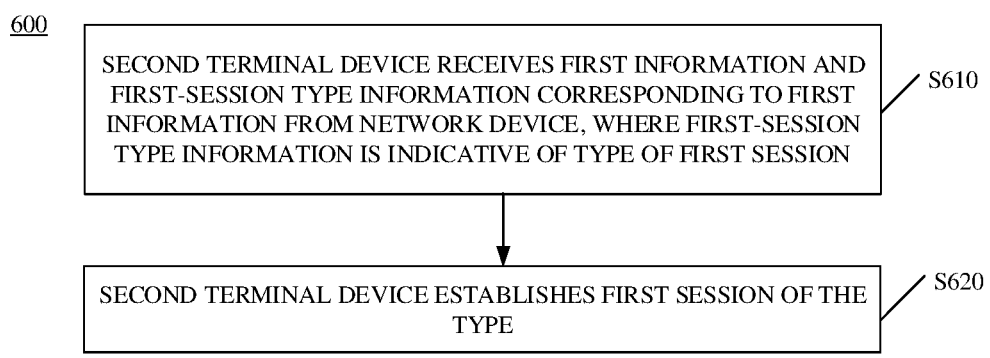
FIG. 6 is a schematic flowchart of a method 600 for session establishment according to implementations of the disclosure.

The disclosure further provides a method for session establishment. FIG. 6 is a schematic flowchart of a method 600 for session establishment according to implementations of the disclosure. The method optionally can be applied to the system illustrated in FIG. 1 or FIG. 2, but is not limited thereto. The method includes at least some the following.

S610, a second terminal device receives first information and first-session type information corresponding to the first information from a network device, where the first-session type information is indicative of a type of a first session.

S620, the second terminal device establishes the first session of the type.

Optionally, the first session includes a PDU session.

Optionally, the type of the first session includes an IP type, an Ethernet type, or an unstructured type.

Optionally, the first information includes at least one of: an RSC, application information, domain name information, or connection capability information requested by an application.

Optionally, the second terminal device receives the first information and the first-session type information corresponding to the first information from the network device as follows. The second terminal device receives a short-range communication configuration from the network device, where the short-range communication configuration includes the first information and the first-session type information corresponding to the first information.

Optionally, the second terminal device receives the first information and the first-session type information corresponding to the first information from the network device as follows. The second terminal device receives a UE route selection policy from the network device, where the UE route selection policy includes the first information and the first-session type information corresponding to the first information.

Optionally, the second terminal device establishes the first session of the type as follows. The second terminal device establishes the first session of the type corresponding to the first information.

Optionally, the method further includes the following. The second terminal device receives relay data from a first terminal device. The second terminal device sends the relay data over the first session of the type.

Optionally, the first terminal device includes a terminal device acting as a remote UE.

Optionally, the second terminal device includes a terminal device acting as a relay UE.

Optionally, the network device includes a PCF.

The disclosure further provides a method for transmission type configuration. FIG. 7 is a schematic flowchart of a method 700 for transmission type configuration according to implementations of the disclosure. The method optionally can be applied to the system illustrated in FIG. 1 or FIG. 2, but is not limited thereto. The method includes at least some of the following.

S710, a network device sends first information and relay-data type information corresponding to the first information to a first terminal device, and sends the first information and first-session type information corresponding to the first information to a second terminal device, where the relay-data type information is indicative of a first type of relay data, and the first-session type information is indicative of a second type of a first session. Relay data of the first type can be transmitted over the first session of the second type.

Optionally, the first session includes a PDU session.

Optionally, the first type of relay data includes an IP type, an Ethernet type, or an unstructured type, and the second type of the first session includes an IP type, an Ethernet type, or an unstructured type.

Optionally, the relay-data type information indicates that the first type of relay data corresponding to the first information is the Ethernet type, and the first-session type information indicates that the second type of the first session corresponding to the first information is the Ethernet type.

Optionally, the relay-data type information indicates that the first type of relay data corresponding to the first information is the unstructured type, and the first-session type information indicates that the second type of the first session corresponding to the first information is the unstructured type.

Optionally, the relay-data type information indicates that the first type of relay data corresponding to the first information is the IP type, the Ethernet type, or the unstructured type, and the first-session type information indicates that the second type of the first session corresponding to the first information is the IP type.

Optionally, the first information includes at least one of: an RSC, application information, domain name information, or connection capability information requested by an application.

Optionally, the network device sends the first information and the relay-data type information corresponding to the first information to the first terminal device as follows. The network device sends a short-range communication configuration to the first terminal device, where the short-range communication configuration includes the first information and the relay-data type information corresponding to the first information.

Optionally, the network device sends the first information and the first-session type information corresponding to the first information to the second terminal device as follows. The network device sends a short-range communication configuration to the second terminal device, where the short-range communication configuration includes the first information and the first-session type information corresponding to the first information.

Optionally, the network device sends the first information and the first-session type information corresponding to the first information to the second terminal device as follows. The network device sends a UE route selection policy to the second terminal device, where the UE route selection policy includes the first information and the first-session type information corresponding to the first information.

Optionally, the network device includes a PCF.

Optionally, the first terminal device includes a terminal device acting as a remote UE.

Optionally, the second terminal device includes a terminal device acting as a relay UE.

Implementations of the disclosure further provide a first terminal device. FIG. 8 is a schematic structural diagram of a first terminal device 800 according to implementations of the disclosure. The first terminal device 800 includes a first receiving module 810 and a first transmitting module 820. The first receiving module 810 is configured to receive first information and relay-data type information corresponding to the first information from a network device, where the relay-data type information indicates a type of relay data. The first transmitting module 820 is configured to send relay data of the type to a second terminal device.

Optionally, the type of relay data includes an IP type, an Ethernet type, or an unstructured type.

Optionally, the first information includes at least one of: an RSC, application information, domain name information, or connection capability information requested by an application.

Optionally, the first receiving module 810 is configured to receive a short-range communication configuration from the network device, where the short-range communication configuration includes the first information and the relay-data type information corresponding to the first information.

Optionally, the first terminal device further includes a communication-connection establishing module. The communication-connection establishing module is configured to establish a short-range communication connection with the second terminal device, where the short-range communication connection corresponds to the first information.

Optionally, the first terminal device includes a terminal device acting as a remote UE, and the second terminal device includes a terminal device acting as a relay UE.

Optionally, the network device includes a PCF.

It should be understood that, the above and other operations and/or functions of the modules of the first terminal device according to implementations of the disclosure are respectively intended for implementing corresponding operations of the first terminal device in the method 300 illustrated in FIG. 3, which will not be repeated herein for the sake of brevity.

Figure 9:
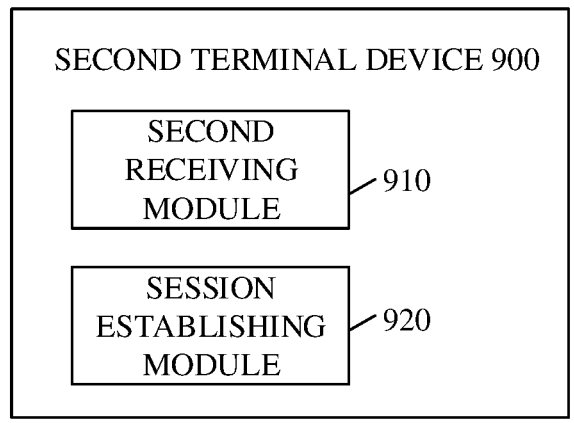
FIG. 9 is a schematic structural diagram of a second terminal device 900 according to implementations of the disclosure.

Implementations of the disclosure further provide a second terminal device. FIG. 9 is a schematic structural diagram of a second terminal device 900 according to implementations of the disclosure. The second terminal device 900 includes a second receiving module 910 and a session establishing module 920. The second receiving module 910 is configured to receive first information and first-session type information corresponding to the first information from a network device, where the first-session type information is indicative of a type of a first session. The session establishing module 920 is configured to establish the first session of the type.

Optionally, the first session includes a PDU session.

Optionally, the type of the first session includes an IP type, an Ethernet type, or an unstructured type.

Optionally, the first information includes at least one of: an RSC, application information, domain name information, or connection capability information requested by an application.

Optionally, the second receiving module 910 is configured to receive a short-range communication configuration from the network device, where the short-range communication configuration includes the first information and the first-session type information corresponding to the first information.

Optionally, the second receiving module 910 is configured to receive a UE route selection policy from the network device, where the UE route selection policy includes the first information and the first-session type information corresponding to the first information.

Optionally, the session establishing module 920 is configured to establish the first session of the type corresponding to the first information.

Optionally, the second terminal device further includes a relay module. The relay module is configured to receive relay data from a first terminal device, and send the relay data over the first session of the type.

Optionally, the first terminal device includes a terminal device acting as a remote UE.

Optionally, the second terminal device includes a terminal device acting as a relay UE.

Optionally, the network device includes a PCF.

It should be understood that, the above and other operations and/or functions of the modules of the second terminal device according to implementations of the disclosure are respectively intended for implementing corresponding operations of the second terminal device in the method 600 illustrated in FIG. 6, which will not be repeated herein for the sake of brevity.

Figure 10:
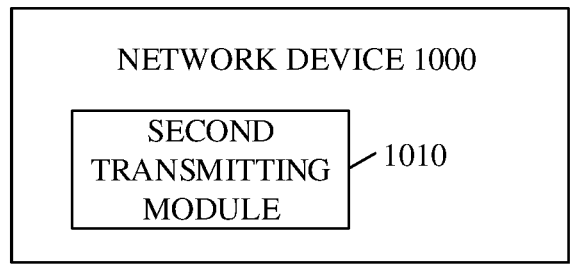
FIG. 10 is a schematic structural diagram of a network device 1000 according to implementations of the disclosure.

Implementations of the disclosure further provide a network device. FIG. 10 is a schematic structural diagram of a network device 1000 according to implementations of the disclosure. The network device 1000 includes a second transmitting module 1010. The second transmitting module 1010 is configured to send first information and relay-data type information corresponding to the first information to a first terminal device, and send the first information and first-session type information corresponding to the first information to a second terminal device, where the relay-data type information is indicative of a first type of relay data, and the first-session type information is indicative of a second type of a first session. Relay data of the first type can be transmitted over the first session of the second type.

Optionally, the first session includes a PDU session.

Optionally, the first type of relay data includes an IP type, an Ethernet type, or an unstructured type, and the second type of the first session includes an IP type, an Ethernet type, or an unstructured type.

Optionally, the relay-data type information indicates that the first type of relay data corresponding to the first information is the Ethernet type, and the first-session type information indicates that the second type of the first session corresponding to the first information is the Ethernet type.

Optionally, the relay-data type information indicates that the first type of relay data corresponding to the first information is the unstructured type, and the first-session type information indicates that the second type of the first session corresponding to the first information is the unstructured type.

Optionally, the relay-data type information indicates that the first type of relay data corresponding to the first information is the IP type, the Ethernet type, or the unstructured type, and the first-session type information indicates that the second type of the first session corresponding to the first information is the IP type.

Optionally, the first information includes at least one of: an RSC, application information, domain name information, or connection capability information requested by an application.

Optionally, the second transmitting module 1010 is configured to send a short-range communication configuration to the first terminal device, where the short-range communication configuration includes the first information and the relay-data type information corresponding to the first information.

Optionally, the second transmitting module 1010 is configured to send a short-range communication configuration to the second terminal device, where the short-range communication configuration includes the first information and the first-session type information corresponding to the first information.

Optionally, the second transmitting module 1010 is configured to send a UE route selection policy to the second terminal device, where the UE route selection policy includes the first information and the first-session type information corresponding to the first information.

Optionally, the network device includes a PCF.

Optionally, the first terminal device includes a terminal device acting as a remote UE, and the second terminal device includes a terminal device acting as a relay UE.

It should be understood that, the above and other operations and/or functions of the modules of the network device according to implementations of the disclosure are intended to implement corresponding operations of the network device in the method 700 illustrated in FIG. 7, which will not be described in detail herein again for the sake of brevity.

It should be noted that, functions of various modules (sub-modules, units, or components, etc.) in the first terminal device 800, the second terminal device 900, and the network device 1000 in implementations of the disclosure may be implemented by different modules (sub-modules, units, or components, etc.), or may be implemented by the same module (sub-module, unit, or component, etc.). For example, the first transmitting module and the second transmitting module may be different modules or may be the same module, all of which can implement the corresponding functions thereof in implementations of the disclosure. In addition, the transmitting module and the receiving module in implementations of the disclosure may be implemented by a transceiver of a device, and some or all of the other modules may be implemented by a processor of the device.

Figure 11:
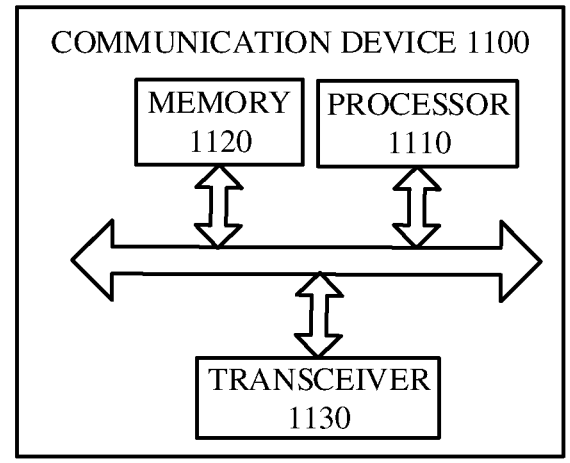
FIG. 11 is a schematic structural diagram of a communication device 1100 according to implementations of the disclosure.

FIG. 11 is a schematic structural diagram of a communication device 1100 according to implementations of the disclosure. The communication device 1100 illustrated in FIG. 11 includes a processor 1110. The processor 1110 can invoke and execute computer programs stored in a memory, to perform the method in implementations of the disclosure.

Optionally, as illustrated in FIG. 11, the communication device 1100 may further include the memory 1120. The processor 1110 can invoke and execute the computer programs stored in the memory 1120, to perform the method in implementations of the disclosure.

The memory 1120 may be a separate device independent of the processor 1110, or may be integrated into the processor 1110.

Optionally, as illustrated in FIG. 11, the communication device 1100 can further include a transceiver 1130. The processor 1110 can control the transceiver 1130 to communicate with other devices, specifically, to transmit information or data to other devices or to receive information or data transmitted by other devices.

The transceiver 1130 may include a transmitter and a receiver. The transceiver 1130 may further include an antenna, where one or more antennas can be provided.

Optionally, the communication device 1100 may be operable as the first terminal device or the second terminal device in implementations of the disclosure, and the communication device 1100 can implement the operations performed by the first terminal device or the second terminal device in various methods in implementations of the disclosure, which will not be repeated herein for the sake of brevity.

Optionally, the communication device 1100 may be operable as the network device in implementations of the disclosure, and the communication device 1100 can implement the operations performed by the network device in various methods in implementations of the disclosure, which will not be repeated herein for the sake of brevity.

Figure 12:
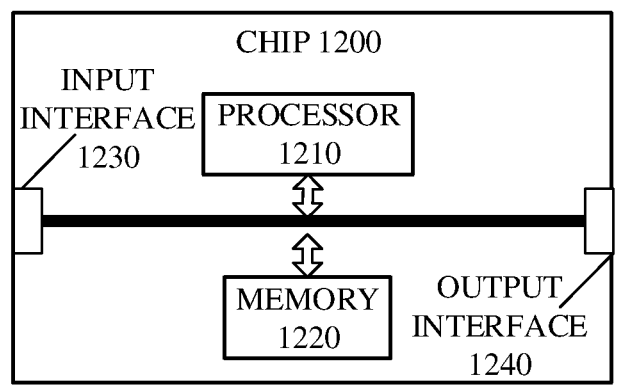
FIG. 12 is a schematic structural diagram of a chip 1200 according to implementations of the disclosure.

FIG. 12 is a schematic structural diagram of a chip 1200 according to implementations of the disclosure. The chip 1200 illustrated in FIG. 12 includes a processor 1210. The processor 1210 can invoke and execute computer programs stored in a memory to perform the method in implementations of the disclosure.

Optionally, as illustrated in FIG. 12, the chip 1200 further includes the memory 1220. The processor 1210 can invoke and execute the computer programs stored in the memory 1220 to perform the method in implementations of the disclosure.

The memory 1220 may be a separate device independent of the processor 1210, or may be integrated into the processor 1210.

Optionally, the chip 1200 may further include an input interface 1230. The processor 1210 can control the input interface 1230 to communicate with other devices or chips, specifically, to obtain information or data transmitted by other devices or chips.

Optionally, the chip 1200 may further include an output interface 1240. The processor 1210 can control the output interface 1240 to communicate with other devices or chips, specifically, to output information or data to other devices or chips.

Optionally, the chip is applicable to the terminal device in implementations of the disclosure. The chip can implement the operations performed by the terminal device in various methods in implementations in the disclosure, which will not be repeated herein for the sake of brevity.

Optionally, the chip is applicable to the network device in implementations of the disclosure. The chip can implement the operations performed by the network device in various methods in implementations of the disclosure, which will not be repeated herein for the sake of brevity.

It should be understood that, the chip referred to in implementations of the disclosure may also be referred to as a system-on-chip (SOC).

The processor mentioned above may be a general-purpose processor, a digital signal processor (DSP), a field programmable gate array (FPGA), an application specific integrated circuit (ASIC), or other programmable logic devices, transistor logic devices, discrete hardware components, etc. The general purpose processor may be a microprocessor, or the processor may be any conventional processor or the like.

The memory mentioned above may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or flash memory. The volatile memory may be a random access memory (RAM).

It should be understood that, the memory above is intended for illustration rather than limitation. For example, the memory in implementations of the disclosure may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), etc. In other words, the memory in implementations of the disclosure is intended to include, but is not limited to, these and any other suitable types of memory.

All or some of the foregoing implementations can be implemented through software, hardware, firmware, or any other combination thereof. When implemented by software, all or some of the foregoing implementations can be implemented in the form of a computer program product. The computer program product includes one or more computer instructions. When the computer instructions are applied and executed on a computer, all or some of the operations or functions of the implementations of the disclosure are performed. The computer can be a general-purpose computer, a special-purpose computer, a computer network, or other programmable apparatuses. The computer instruction can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should be understood that, in various implementations of the disclosure, magnitudes of sequence numbers of various operations are not intended to indicate an execution order, and the execution order of the operations should be determined by their functions and internal logic and shall not constitute any limitation on an implementation process of implementations of the disclosure.

It will be evident to those skilled in the art that, for the sake of convenience and brevity, in terms of the specific working processes of the foregoing systems, apparatuses, and units, reference can be made to the corresponding processes in the foregoing method implementations, which will not be repeated herein.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A first terminal device, comprising:
    a transceiver;
    a processor; and
    a memory storing computer programs which, when executed by the processor, are operable with the processor to:
    cause the transceiver to receive first information and relay-data type information corresponding to the first information from a network device, the relay-data type information being indicative of a type of relay data; and
    cause the transceiver to send relay data of the type to a second terminal device, wherein the type of the relay data is consistent with a type of a first session established between the second terminal device and the network device, wherein the type of relay data comprises an Ethernet type or an unstructured type, and the first information comprises a relay service code (RSC);
    wherein the first information further comprises at least one of: domain name information, or connection capability information requested by an application.

2. The first terminal device of claim 1, wherein the transceiver configured to receive the first information and the relay-data type information corresponding to the first information from the network device is configured to:
    receive a proximity communication configuration from the network device, wherein the proximity communication configuration comprises the first information and the relay-data type information corresponding to the first information.

3. The first terminal device of claim 1, wherein the processor is configured to:
establish a proximity communication connection with the second terminal device, wherein the proximity communication connection corresponds to the first information.

4. The method of claim 1, wherein the network device comprises a policy control function (PCF).

5. A second terminal device, comprising:
a transceiver;
a processor; and
a memory storing computer programs which, when executed by the processor, are operable with the processor to:
cause the transceiver to receive a UE route selection policy from a network device, wherein the route selection policy contains first information and first-session type information corresponding to the first information, the first-session type information being indicative of a type of a first session; and
establish the first session of the type, wherein the type of the first session comprises an Ethernet type or an unstructured type, and the first information comprises a relay service code (RSC),
wherein the first information further comprises at least one of: domain name information, or connection capability information requested by an application.

6. The second terminal device of claim 5, wherein the first session comprises a protocol data unit (PDU) session.

7. The second terminal device of claim 5, wherein the transceiver configured to receive the first information and the first-session type information corresponding to the first information from the network device is configured to:
receive a proximity communication configuration from the network device, wherein the proximity communication configuration comprises the first information and the first-session type information corresponding to the first information.

8. The second terminal device of claim 5, wherein the transceiver configured to receive the first information and the first-session type information corresponding to the first information from the network device is configured to:
receive a user equipment (UE) route selection policy from the network device, wherein the UE route selection policy comprises the first information and the first-session type information corresponding to the first information.

9. The second terminal device of claim 5, wherein the processor configured to establish the first session of the type is configured to:
establish the first session of the type corresponding to the first information.

10. The second terminal device of claim 5, wherein the processor is further configured to:
cause the transceiver to receive relay data from a first terminal device; and
cause the transceiver to send the relay data over the first session of the type.

11. A network device, comprising:
a transceiver;
a processor; and
a memory storing computer programs which, when executed by the processor, are operable with the processor to:
cause the transceiver to send first information and relay-data type information corresponding to the first information to a first terminal device, and send the first information and first-session type information corresponding to the first information via a UE route selection policy to a second terminal device, wherein the relay-data type information is indicative of a first type of relay data, and the first-session type information is indicative of a second type of a first session, and wherein
the first type is consistent with the second type, relay data of the first type can be transmitted over the first session of the second type, wherein the first type of relay data comprises an Ethernet type or an unstructured type, and the first information comprises a relay service code (RSC),
wherein the first information further comprises at least one of: domain name information, or connection capability information requested by an application.

12. The network device of claim 11, wherein the second type of the first session comprises an IP type, an Ethernet type, or an unstructured type.

13. The network device of claim 11, wherein the transceiver configured to send the first information and the relay-data type information corresponding to the first information to the first terminal device is configured to:
send a proximity communication configuration to the first terminal device, wherein the proximity communication configuration comprises the first information and the relay-data type information corresponding to the first information.

14. The network device of claim 11, wherein the transceiver configured to send the first information and the first-session type information corresponding to the first information to the second terminal device is configured to:
send a proximity communication configuration to the second terminal device, wherein the proximity communication configuration comprises the first information and the first-session type information corresponding to the first information.

15. The network device of claim 11, wherein the transceiver configured to send the first information and the first-session type information corresponding to the first information to the second terminal device is configured to:
send a user equipment (UE) route selection policy to the second terminal device, wherein the UE route selection policy comprises the first information and the first-session type information corresponding to the first information.

* * * * *